July 26, 1932.  M. GRALENSKI  1,869,100
RESILIENT WHEEL FOR VEHICLES
Filed July 5, 1930
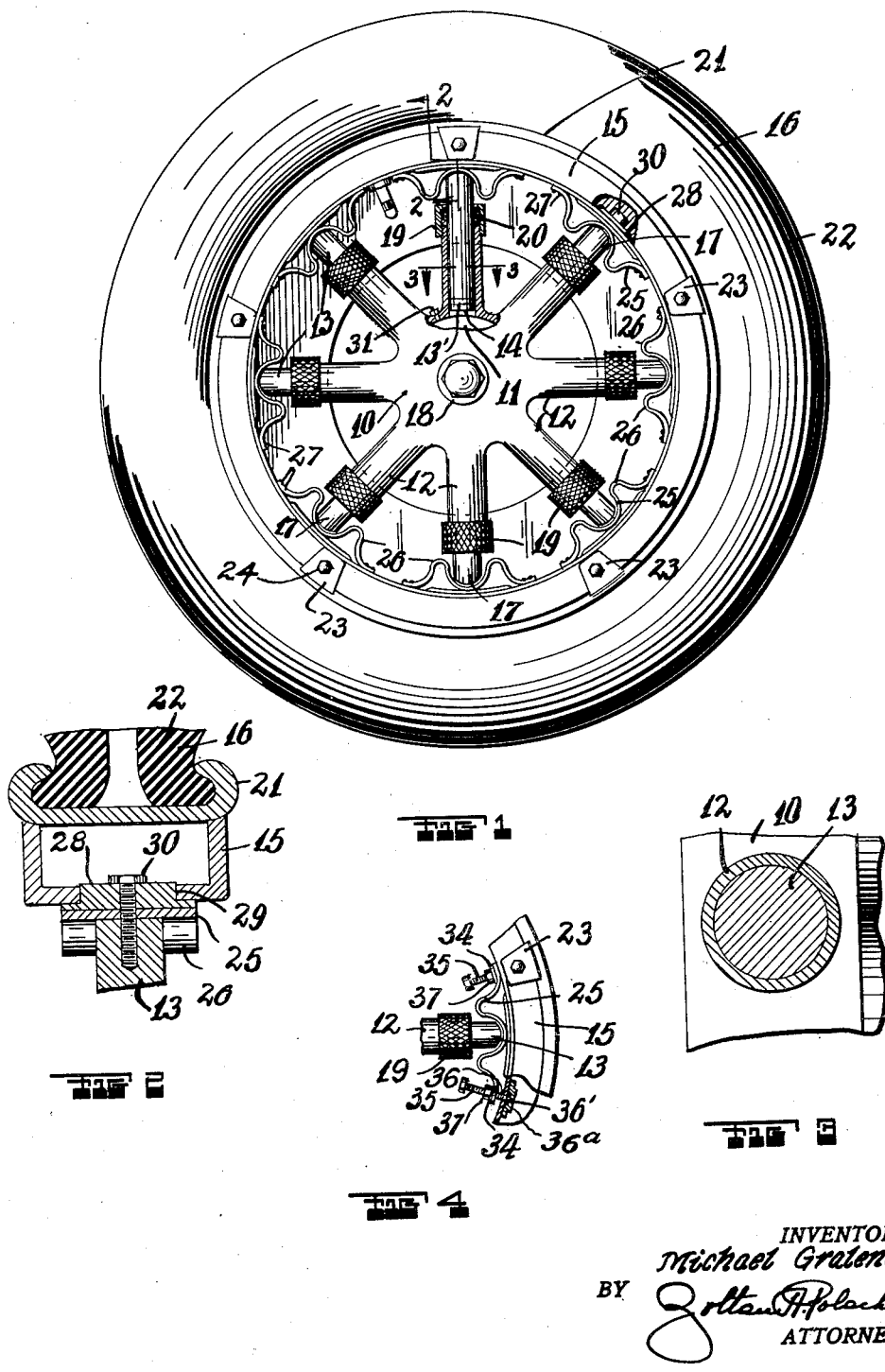
INVENTOR
Michael Gralenski
BY
ATTORNEY Patented July 26, 1932

1,869,100

UNITED STATES PATENT OFFICE

MICHAEL GRALENSKI, OF AMHERST, MASSACHUSETTS

RESILIENT WHEEL FOR VEHICLES

Application filed July 5, 1930. Serial No. 465,802.

This invention relates to new and useful improvements in a resilient wheel.

The invention has for an object the provision of a device of the class mentioned which is of simple durable construction, dependable in use and efficient in action, and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a side elevational view of a wheel constructed according to this invention, a portion thereof being broken away to disclose interior parts.

Fig. 2 is a fragmentary sectional view taken on the line 2—2 of Fig. 1.

Fig. 3 is a fragmentary sectional view taken on the line 3—3 of Fig. 1.

Fig. 4 is a fragmentary view of a portion of Fig. 1, illustrating a modification.

The resilient wheel comprises a wheel hub 10 for rotatively engaging upon an axle and formed with a circular hollow 11 coaxial with said axle, hollow spoke inner sections 12 radially projecting from said hub 10 and communicating with said circular hollow 11, spoke outer sections 13 telescopically engaging within said inner sections 12 and having their inner ends 14 terminating a short distance from the hollow 11 in said hub, a wheel felloe 15 supporting a tire 16 on its periphery, and means for resiliently connecting the outer ends 17 of said spoke outer sections 13 within said wheel rim 15 so as to resiliently hold the spoke outer sections 13 radially.

A hub cap 18 engages upon the wheel hub 10 as is conventional. The spoke inner sections 12 are shown integral with the wheel hub 10. A packing nut 19 is arranged upon each of the spoke inner sections 12 at the outer extremities and coacts with the spoke outer sections 13 for forming a tight joint preventing the leakage of oil. Piston rings 13' on the outer sections 13 aid in forming the tight joint. This joint allows longitudinal movements of the sections. It is shown to consist of a nut threadedly engaged upon the outer end of the spoke inner sections 12 and provided with packing material 20 capable of being clamped together upon tightening of the nut upon the threads. The tire 16 consists of a tire rim 21 and a tire shoe 22. A plurality of clamping plates 23 are attached upon the wheel felloe 15 by bolts 24 and extend across the edges of the tire rim 21 for holding the tire in place upon the wheel.

The means for resiliently connecting the outer ends of the spoke outer sections 13 within said wheel rim 15 so that the spoke outer sections are resiliently held radially consists of a spring 25 for each of the spokes and of flat wide construction as shown in Fig. 2, and formed with transverse waved portions 26 arranged on opposite sides of the spoke outer section 13. It is very necessary that these waved portions be arranged transversely across the width of the wheel so as to hold the spoke outer sections resiliently in the plane of the wheel. Screws 27 attach the ends of the springs 25 within the wheel felloe 15. A rubbing plate 28 is located upon the outer central portion of each of the springs 25 and normally rests within apertures 29 formed within the wheel felloe 15. A cap screw 30 engages thru the rubbing plate 29 and threadedly engages into the outer end 17 of the spoke outer section 13 for attaching the spoke section upon the spring. The springs 25 allow resiliency for the spokes so that the outer spoke sections may engage slightly further into or out the spoke inner sections and thus a resilient wheel is had.

The means for entrapping a quantity of oil within the hub hollow 11 consists of a plug 31 for normally plugging an opening, communicating with the hollow 11 for the entrance of oil within the hollow.

In the modified form of the device illustrated in Fig. 4, a means has been shown for changing the tension of the springs 25. This means comprises a block 34 fixed on each end of each spring 25 and threadedly engaged by screws 35 rotatively mounted at their inner ends 36 upon the wheel felloe 15. The rotative mountings are accomplished by heads 36' formed upon the ends of the screws which enter the felloe through apertures. Locks 36ª are attached upon the felloe over the heads 36' to prevent the screws from falling in. Lock nuts 37 threadedly engage upon the screws 36 and are abuttable against the blocks 34 for locking the blocks in various positions along the lengths of the screws. When the nuts 37 are loosened and the screws 35 rotated, the location of the ends of the spring 25 will be changed for changing the tension of the springs. Thus the wheel may be adapted to efficiently carry different loads so as to have maximum resiliency. The wheel can be adapted for cars of different weights.

Before operation of the wheel, it is necessary to engage a quantity of oil within the hollow 11. This oil may be inserted thru the opening in the hub upon removal of the plug 31. The oil so acts in that as the wheel rotates the portions at the top successively assume positions at the bottom so that the oil within the hollow 11 successively engages all of the interior of the hollow and thus thoroughly lubricates the telescoping spokes.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A resilient wheel, comprising a wheel hub for rotatively engaging upon an axle and formed with a circular hollow coaxial with said axle, hollow spoke inner sections radially projecting from said hub and communicating with said circular hollow, spoke outer sections telescopically engaging within said inner sections and having their inner ends terminating a short distance from the hollow in said hub, a wheel rim supporting a tire on its periphery, and means for resiliently connecting the outer ends of said spoke outer sections within said wheel rim so as to resiliently hold the spoke outer sections radially, said means for resiliently connecting the outer ends of said spoke outer sections within the wheel rim so as to resiliently hold the spoke outer sections radially comprising a spring attached upon the outer end of each of the spoke outer sections and formed with transverse waved portions, and means for attaching the outer ends of the springs onto said rim and attaching the central portions of the springs upon said spoke outer sections.

2. A resilient wheel, comprising a wheel hub for rotatively engaging upon an axle and formed with a circular hollow coaxial with said axle, hollow spoke inner sections radially projecting from said hub and communicating with said circular hollow, spoke outer sections telescopically engaging within said inner sections and having their inner ends terminating a short distance from the hollow in said hub, a wheel rim supporting a tire on its periphery, and means for resiliently connecting the outer ends of said spoke outer sections within said wheel rim so as to resiliently hold the spoke outer sections radially, said means for resiliently connecting the outer ends of said spoke outer sections within the wheel rim so as to resiliently hold the spoke outer sections radially comprising a spring attached upon the outer end of each of the spoke outer sections and formed with transverse waved portions, means for attaching the outer ends of the springs onto said rim and attaching the central portions of the springs upon said spoke outer sections, and means for changing the tension of said springs.

3. A resilient wheel, comprising a wheel hub for rotatively engaging upon an axle and formed with a circular hollow coaxial with said axle, hollow spoke inner sections radially projecting from said hub and communicating with said circular hollow, spoke outer sections telescopically engaging within said inner sections and having their inner ends terminating a short distance from the hollow in said hub, a wheel rim supporting a tire on its periphery, and means for resiliently connecting the outer ends of said spoke outer sections within said wheel rim so as to resiliently hold the spoke outer sections radially, said means for resiliently connecting the outer ends of said spoke outer sections within the wheel rim so as to resiliently hold the spoke outer sections radially comprising a spring attached upon the outer end of each of the spoke outer sections and formed with transverse waved portions, means for attaching the outer ends of the springs onto said rim and attaching the central portions of the springs upon said spoke outer sections, and means for changing the tension of said springs, said means including a block fixed upon one end of each spring, a screw threadedly engaged through the block and rotatively mounted upon the wheel felloe, and a lock nut on said screw for abutting against said block.

In testimony whereof I have affixed my signature.

MICHAEL GRALENSKI.